United States Patent [19]

Lee et al.

[11] 4,032,502

[45] June 28, 1977

[54] ORGANOSILOXANE COMPOSITIONS FOR LIQUID INJECTION

[75] Inventors: Chi-Long Lee; Ollie W. Marko, both of Midland; Jay R. Schulz, Bangor Township, Bay Count, all of Mich.

[73] Assignee: Dow Corning Corporation, Midland, Mich.

[22] Filed: Oct. 10, 1975

[21] Appl. No.: 621,432

[52] U.S. Cl. .................. 260/37 SB; 260/46.5 UA; 260/46.5 G; 260/46.5 H; 264/328
[51] Int. Cl.² ........................................ C08L 83/04
[58] Field of Search ............. 260/46.5 UA, 46.5 H, 260/46.5 G, 37 SB; 264/328

[56] References Cited
UNITED STATES PATENTS

| | | | |
|---|---|---|---|
| 3,445,420 | 5/1969 | Kookootsedes et al. | 260/46.5 UA |
| 3,697,473 | 10/1972 | Polmanteer et al. | 260/37 SB |
| 3,933,882 | 1/1976 | Lee et al. | 260/46.5 UA |

Primary Examiner—Melvyn I. Marquis

Attorney, Agent, or Firm—George A. Grindahl

[57] ABSTRACT

Organopolysiloxane compositions suitable for use in a liquid injection molding process of elastomeric articles are produced by mixing a vinyl-endblocked polydiorganosiloxane fluid copolymer containing dimethylsiloxane units and methyl-3,3,3-trifluoropropylsiloxane units, a treated, reinforcing silica filler, a platinum-containing catalyst, a curing agent comprising dimethylhydrogensiloxane units as the only source of silicon-bonded hydrogen atoms and, as an inhibitor for the platinum-containing catalyst, certain olefinic siloxanes and/or acetylenic siloxanes. These compositions are especially suited for liquid injection molding because they can be stored at room temperature for days and can be injected into a hot mold with pressures less than 352 kg./sq.cm. (5,000 psi) whereon they cure rapidly to an elastomeric article having a tensile strength greater than 42 kg./sq.cm., and elongation at break greater than 300 percent and a tear strength greater than 7 kg./cm.

11 Claims, No Drawings

ORGANOSILOXANE COMPOSITIONS FOR LIQUID INJECTION

BACKGROUND OF THE INVENTION

1. Field of the Invention

This invention relates to curable organopolysiloxane compositions comprising silicon-bonded 3,3,3-trifluoropropyl groups and to a method for injection molding of said composition to form an elastomeric article.

2. Description of the Prior Art

Injection molding of liquid, curable compositions to form small elastomeric articles is highly desirable because the attendant low injection pressures and rapid production rates permit a greater selection of injecting and molding conditions and greater economy. It is desirable to use organopolysiloxane compositions bearing 3,3,3-trifluoropropyl groups for the preparation of certain elastomeric articles since said compositions, when cured, display usefulness in extremely cold or hot environments in the presence of many solvents. However, prior art organopolysiloxane compositions bearing 3,3,3-trifluoropropyl groups are unsatisfactory in many respects for the injection molding of small elastomeric articles.

Organopolysiloxane compositions wherein essentially all of the polymer units are methyl-3,3,3-trifluoropropylsiloxane units are commercially available in many forms. In the cured form these compositions possess excellent resistance to the deleterious effects of hydrocarbon fuels and oils, but their resistance to polar organic compounds such as hydrocarbon esters and ketones is much less. These compositions are thus unsatisfactory for the preparation of articles for general applications.

It has been shown by Holbrook, Canadian Pat. No. 571,381 to prepare vulcanizable compositions comprising a filler, a vulcanizing agent and a copolymer of a fluorinated siloxane and a diorganosiloxane, wherein the non-fluorinated organic groups of the copolymer are monovalent hydrocarbon radicals. However, these compositions have inferior physical properties for many applications.

Curable compositions comprising a vinyl-containing polydiorganosiloxane and a siloxane bearing silicon-bonded hydrogen atoms wherein the latter siloxane comprises molecules having two silicon-bonded hydrogen atoms and molecules having three or more silicon-bonded hydrogen atoms are known. Thus, Polmanteer, et al., U.S.Pat. No. 3,697,473 teach a curable composition consisting essentially of a triorganosiloxy-terminated polydiorganosiloxane having two vinyl radicals per molecule and having a viscosity of from 100 to 10,000 centipoise at 25° C., where at least 50 percent of the organic radicals are methyl, and a mixture of silicon-containing compounds having silicon-bonded hydrogen atoms. The mixture of silicon-containing compounds having silicon-bonded hydrogen atoms consists essentially of an organosiloxane compound containing two silicon-bonded hydrogen atoms per molecule and an organosiloxane compound containing from 3 to 10 inclusive silicon-bonded hydrogen atoms per molecule. At least 10 percent of the silicon-bonded hydrogen atoms are derived from each of the two types of organosiloxane compounds bearing silicon-bonded hydrogen atoms. The silicon-bonded hydrogen atoms in any of the organosiloxane compounds can be of the type $HSiO_{3/2}$ or the hydrogen atoms can be bonded to silicon atoms bearing one or two organic radicals. However, Polmanteer, et al. do not teach or suggest the unique features of a curable composition comprising a copolymer of dimethylsiloxane units and methyl-3,3,3-trifluoropropylsiloxane units that is suitable for liquid injection molding of small elastomeric articles.

To be useful for liquid injection molding of small elastomeric articles a curable composition should have a high injection rate and a short cure time; and the cured composition should have sufficient strength to allow the removal of the hot, elastomeric article from a hot mold. No prior art organopolysiloxane composition comprising a copolymer consisting essentially of dimethylsiloxane units and methyl-3,3,3-trifluoropropylsiloxane units is useful for such a liquid injection molding process. While it is well known to prepare a curable organopolysiloxane composition by mixing a vinyl-endblocked polydiorganosiloxane, a treated filler, a curing agent bearing silicon-bonded hydrogen atoms, a curing catalyst and an inhibitor for the catalyst, the unique combination of certain components to give the compositions for this invention is neither known nor obvious.

SUMMARY OF THE INVENTION

It is a primary object of this invention to provide an organopolysiloxane composition having silicon-bonded 3,3,3-trifluoropropyl groups that is suitable for use in a process of liquid injection molding of small, elastomeric articles.

It is another object of this invention to provide a curable organopolysiloxane composition having dimethylsiloxane units and methyl-3,3,3-trifluoropropylsiloxane units that is rapidly injectable under low pressure into a cavity of a hot mold and is rapidly curable with heat to a strong elastomeric article, said composition having a Standard Cure Time of less than 100 seconds, a Standard Injection Rate of greater than 100 grams per minute and a Standard Pot Life of greater than 10 hours.

For the purposes of this invention the Standard Injection Rate of a composition is the number of grams of the composition at 25° C. that can be expelled, under a force of 6.3 kg./sq.cm. (90 psi) air pressure, in 1 minute from a concial nozzle having a circular exit of 0.318 cm. (0.125 in.) in diameter. The Standard Cure Rate of a composition is determined using a Monsanto rheometer and is the time required at 121° C. (250° F.) for the rheometer torque reading to reach a value which is 90 percent of the maximum torque reading for the composition. The Standard Pot Life is the time required at 25° C. for the viscosity of the composition to reach a value which is twice as large as the viscosity at mixing.

These and other objects are achieved by the compositions of this invention consisting essentially of a vinyl-dimethylsiloxane-endblocked copolymer of dimethylsiloxane units and methyl-3,3,3-trifluoropropylsiloxane units, a treated, reinforcing silica filler, an organosiloxane curing agent comprising dimethylhydrogen-siloxane units as the only source of silicon-bonded hydrogen atoms, a platinum-containing catalyst for the reaction of ≡Si—H with ≡Si-vinyl and an inhibitor for the platinum-catalyzed curing reaction.

The compositions of this invention are uniquely suited for a method of injection molding articles having a mass of less than 100 grams per article wherein the composition, at less than 50° C., is injected into a cavity of a mold at a temperature above 100° C., the injecting being done at a pressure of less than 352 kg./sq.cm. (5,000 psi); the injected composition is allowed to cure in the cavity of the hot mold and the cured composition is removed from the cavity of the hot mold.

DESCRIPTION OF THE INVENTION

This invention relates to a curable composition, suitable for use in a method of liquid injection molding of elastomeric articles, consisting essentially of (a) 100 parts by weight of an essentially linear polydiorganosiloxane fluid copolymer having two silicon-bonded vinyl groups per molecule and having the average formula

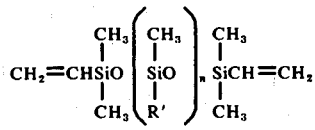

wherein from 25 to 75 percent of all R' groups are 3,3,3-trifluoropropyl and the remaining R' groups are methyl and $n$ has an average value such that the viscosity of (a) has a value of from 500 to 10,000 centistokes at 25° C.; (b) an organosiloxane, soluble in (a) and consisting essentially of (i) a polyorganosiloxane consisting essentially of $H(CH_3)_2SiO_{1/2}$ units and units selected from the group consisting of $QSiO_{3/2}$ units and $SiO_{4/2}$ units, there being from 3 to 10 inclusive silicon-bonded hydrogen atoms per molecule of (i), Q is 3,3,3-trifluoropropyl, phenyl or an alkyl group having 1 to 6 inclusive carbon atoms and the ratio of the total number of $SiO_{4/2}$ units and $QSiO_{3/2}$ units to $H(CH_3)_2SiO_{1/2}$ units in (i) has an average value of from 0.25 to 0.75 and, (ii) a polydiorganosiloxane consisting essentially of $H(CH_3)_2SiO_{1/2}$ units and $R''_2SiO$ units, wherein each R'' is methyl, ethyl, phenyl or 3,3,3-trifluoropropyl, there being two silicon-bonded hydrogen atoms per molecule of (ii) and an average of from 3 to 10 silicon atoms per molecule of (ii), the amounts of (i) and (ii) being sufficient to provide a total of from 0.75 to 3.0 silicon bonded hydrogen atoms in (b) for every silicon-bonded vinyl group in the composition and from 0 to 1 inclusive silicon-bonded hydrogen atoms in (ii) for every silicon-bonded hydrogen atom in (i); (c) a platinum-containing catalyst, soluble in (a) and providing at least 1 part by weight of platinum for every 1 million parts by weight of the composition; (d) an effective amount of platinum catalyst inhibitor selected from the group consisting of acetylenic silanes of the formulae

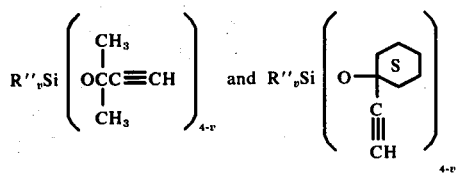

and olefinic siloxanes of the formulae

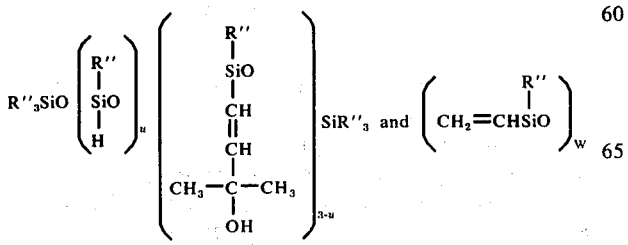

wherein R'' is, independently, methyl, ethyl, phenyl or 3,3,3-trifluoropropyl, $u$ is an integer from 1 to 2 inclusive, $v$ is an integer from 0 to 2 inclusive and $w$ is an integer from 3 to 6 inclusive; and (e) at least 5 parts by weight of a reinforcing silica filler having a surface area of at least 50 square meters per gram and having the surface thereof treated with an organosilicon compound to prevent appreciable crepe-aging of the curable composition; said curable composition having a Standard Injection Rate of greater than 100 grams per minute at 25° C., a Standard Cure Time of less than 100 seconds at 121° C., a Standard Pot Life of greater than 10 hours at 25° C., and when heated at 150° C. for 15 minutes and at 200° C. for 8 hours, will cure to an elastomeric material characterized by a tensile strength greater than 42 kg./sq. cm., an elongation at break greater than 300 percent, a tear strength of greater than 7 kg./cm.

The present invention resides in a unique combination of certain components that gives compositions which have the properties needed for a process of liquid injection molding of elastomeric articles.

Component (a) is a dimethylvinylsiloxane-endblocked copolymer having dimethylsiloxane units and methyl-3,3,3-trifluoropropylsiloxane units and having the average formula

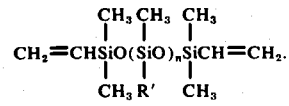

Each R' group can be separately methyl or 3,3,3-trifluoropropyl. From 25 to 75 percent of all R' groups in (a) are 3,3,3-trifluoropropyl groups and the remaining R' groups are methyl. In order to obtain cured compositions having optimum resistance to various solvents it is preferred to use compositions containing linear polydiorganosiloxane fluids (a) having equal molar amounts of dimethylsiloxane units and methyl-3,3,3-trifluoropropylsiloxane units. Copolymer (a) is endblocked with dimethylvinylsiloxane units so that there are essentially two vinyl groups per copolymer molecule. The viscosity of copolymer (a) should have a value of from 500 to 10,000 centistokes at 25° C. A preferred viscosity range for the copolymer (a) is from 500 to 5,000 centistokes at 25° C. since the compositions of this invention have an optimum combination of physical properties when the viscosity of the copolymer is within said preferred range. The value of $n$ is selected to produce the desired copolymer viscosity. For example, for a copolymer having equal molar amounts of dimethylsiloxane units and methyl-3,3,3-trifluoropropyl siloxane units, a value of $n$ of from approximately 100 to 250 will result in a copolymer viscosity of from 500 to 5,000 centistokes at 25° C.

Copolymer (a) can be prepared by any suitable method for preparing vinyl-endblocked, polydiorganosiloxanes. For example, copolymer (a) can be prepared by cohydrolysis of the proper amounts of dimethyldichlorosilane, methyl-3,3,3-trifluoropropyldichlorosilane and dimethylvinylchlorosilane and equilibration of the resulting hydrolyzate, using either an acid or base catalyst. A preferred method for making copolymer (a) comprises the equilibrium copolymerization of the appropriate amounts of 2,4,6-trimethyl-2,4,6-tris(3,3,3-trifluoropropyl)cyclotrisiloxane, cyclopolydimethylsiloxane and sym-divinyltetramethyldisiloxane in the presence of an acid or base catalyst. By the terms equilibrium polymerization and equilibration it is meant that the reaction is continued until there is essentially no further change with time in the weight ratio of cyclopolydiorganosiloxanes to vinyl-endblocked polydiorganosiloxanes.

Copolymer (a), as produced above, comprises a mixture of vinyl-endblocked linear species having various polymer chain lengths and various arrangements of the described siloxane units. It is to be understood that copolymer (a) may have a random arrangement of dimethylsilsiloxane units and methyl-3,3,3-trifluoropropylsiloxane units or (a) may have some arrangements of polydimethylsiloxane blocks and poly(methyl-3,3,3-trifluoropropyl)siloxane blocks of various sizes. Furthermore, there may be present in polydiorganosiloxane fluid (a) small amounts of vinyldimethylsiloxane-endblocked polydimethylsiloxane and vinyldimethylsiloxane-endblocked poly(methyl-3,3,3-trifluoropropyl)siloxane. In addition, while polydiorganosiloxane fluid (a) is described as linear, trace amounts of branching sites such as R'SiO$_{3/2}$ units and SiO$_{4/2}$ units, which are frequently present in commercial polydiorganosiloxanes, can be present in (a).

Copolymer (a), as produced above, also comprises varying amounts of cyclopolydiorganosiloxane molecules which are not a part of the compositions of this invention. While small quantities of these cyclopolydiorganosiloxane molecules, otherwise known as equilibrium cyclics, may be tolerated in the compositions of this invention, they are preferably removed from copolymer (a) by any suitable means, such as distillation, either before or during the preparation of the compositions of this invention.

Component (b) is a curing agent for the compositions of this invention and is a polyorganosiloxane (i) having H(CH$_3$)$_2$SiO$_{1/2}$ units in combination with QSiO$_{3/2}$ units and/or SiO$_{4/2}$ units, said polyorganosiloxane (i) optionally being mixed with a polydiorganosiloxane (ii) having H(CH$_3$)$_2$SiO$_{1/2}$ units in combination with R''$_2$SiO units. The silicon-bonded hydrogen atoms in component (b) are reactive with silicon-bonded vinyl groups in the composition in the presence of a platinum-containing catalyst and are essentially all bonded to silicon atoms which bear two silicon-bonded methyl groups. The resulting dimethylhydrogensiloxane units are essentially the only source of silicon-bonded hydrogen atoms in the compositions of this invention, and only trace amounts of Q(H)SiO and HSiO$_{3/2}$ units, which are usually present in commercial hydrogen-bearing siloxanes, are permitted. The compositions of this invention, with their unusually high tensile strength, elongation and tear strength, are not obtained if component (b) contains more than trace amounts of HSiO$_{3/2}$ units and Q(H)SiO units.

There is a sufficient amount of component (b) present to provide from 0.75 to 3.0 silicon-bonded hydrogen atoms for every silicon-bonded vinyl group in the composition. A preferred range for the value of the ratio of silicon-bonded hydrogen atoms to silicon-bonded vinyl groups is from 1.0 to 2.0. Additionally, component (b) should be soluble in copolymer (a) in order to effectively cure the compositions of this invention.

Polyorganosiloxane (i) of component (b) consists essentially of H(CH$_3$)$_2$SiO$_{1/2}$ units bonded to one or more QSiO$_{3/2}$ units and/or SiO$_{4/2}$ units. Q can be phenyl, 3,3,3-trifluoropropyl, or an alkyl group having from 1 to 6 carbon atoms such as methyl, ethyl, isopropyl, butyl, cyclopentyl, and hexyl. The ratio of the total number of QSiO$_{3/2}$ units and SiO$_{4/2}$ units in (i) to the H(CH$_3$)$_2$SiO$_{1/2}$ units in (i) has an average value of from 0.25 to 0.75. In addition, there are from 3 to 10 silicon-bonded hydrogen atoms per molecule of (i). Compositions useful as (i) include compositions having the average formulae

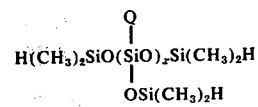

and

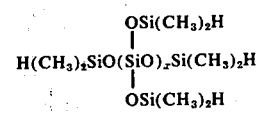

wherein $x$ has an average value of from 1 to 4 inclusive and Q is as defined above. Specific examples of these useful compositions include, where $x = 1$, Si{OSi(CH$_3$)$_2$H}$_4$, C$_6$H$_5$Si{OSi(CH$_3$)$_2$H}$_3$, CH$_3$Si{OSi(CH$_3$)$_2$H}$_3$, and CF$_3$CH$_2$CH$_2$Si{OSi(CH$_3$)$_2$H}$_3$. Other examples of (i) that are useful include compositions having the average formula

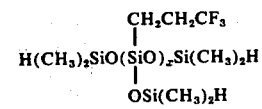

and

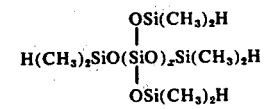

where $x$ has an average value greater than 1, for example 2 or 3. It is to be understood that polyorganosiloxane (i) can be a pure compound or a mixture of compounds consisting essentially of QSiO$_{3/2}$ units and/or SiO$_{4/2}$ units and H(CH$_3$)$_2$SiO$_{1/2}$ units in the proper ratio and having from 3 to 10 inclusive silicon-bonded hydrogen atoms per molecule.

Polyorganosiloxanes (i) are well known in the silicone rubber art. They may be prepared by any suitable method for preparing polyorganosiloxanes having silicon-bonded hydrogen atoms, such as hydrolysis and condensation of suitable, hydrolyzable organosilanes. U.S. Pat. No. 3,344,160 to Holbrook, is hereby incorporated by reference to show the preparation of some 3,3,3-trifluoropropyl-containing polyorganosiloxanes bearing hydrogendimethylsiloxane units that are suitable for use as (i).

Polydiorganosiloxane (ii) of component (b) consists essentially of H(CH$_3$)$_2$SiO$_{1/2}$ units and R''$_2$SiO units. The R'' groups of the R''$_2$SiO units can each be methyl, ethyl, phenyl, or 3,3,3-trifluoropropyl thereby providing R''$_2$SiO units such as dimethyl-, diphenyl-, methylphenyl-, ethylmethyl-, methyl-3,3,3-trifluoropropyl-, and phenyl-3,3,3-trifluoropropylsiloxane units. Polydiorganosiloxane (ii) has essentially two silicon-bonded hydrogen atoms per molecule and from 3 to 10 silicon atoms per molecule. A composition useful as (ii) is the polydiorganosiloxane having the average formula

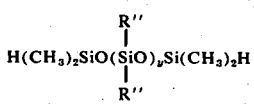

where $y$ has an average value of from 1 to 3 inclusive. In particular, a compound useful as (ii) has the formula

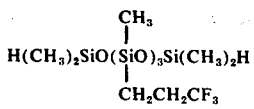

Another compound useful as (ii) has the formula

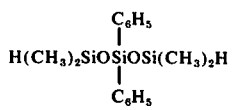

Polydiorganosiloxanes (ii) are known in the art and can be prepared by any method suitable for preparing short-chain polydiorganosiloxanes having hydrogen endblocks.

Component (b) of the compositions of this invention can consist essentially of only polyorganosiloxane (i) or component (b) can be a mixture of polyorganosiloxane (i) and polydiorganosiloxane (ii). The amounts of (i) and (ii) that are suitable for use herein are such that there are, in the mixture of (i) and (ii), from 0 to 1 inclusive silicon-bonded hydrogen atoms in (ii) for every silicon-bonded hydrogen atom in (i). A useful component (b) is a mixture of sufficient amounts of (i) and (ii) to provide from 0.2 to 0.6 silicon-bonded hydrogen atoms in (ii) for every silicon-bonded hydrogen atom in (i).

The compositions of this invention are cured with the aid of a catalyst (c) which can be any of the platinum-containing catalysts that are known to catalyze the reaction of silicon-bonded hydrogen atoms with silicon-bonded vinyl groups and which are soluble in the polydiorganosiloxane fluid (a). Platinum-containing catalysts which are not soluble in said fluid are not sufficiently effective to provide for the compositions of this invention a Standard Cure Time of less than 100 seconds, as hereinbefore defined, although they may be suitable for curing said compositions in a longer period of time. A class of platinum-containing catalysts particularly suitable for use in the compositions of this invention are the complexes of chloroplatinic acid described by Willing in U.S. Pat. No. 3,419,593 which is hereby incorporated by reference to show the preparation of said complexes. A preferred catalyst, described by Willing, is a platinum-containing complex which is the reaction product of chloroplatinic acid and sym-divinyltetramethyldisiloxane.

The platinum-containing catalyst is present in an amount sufficient to provide at least one part by weight of platinum for every one million parts by weight of the composition of this invention. It is preferred to use sufficient catalyst (c) so that there is present from 10 to 50 parts by weight platinum for every one million parts by weight of said composition. It is to be understood that amounts of platinum greater than the 50 parts per million stated above are also effective in the compositions of this invention but said larger amounts, especially when the preferred catalyst is used, are unnecessary, wasteful, and require excessive amounts of the platinum-catalyst inhibitor, hereinafter described, to inhibit the cure of said compositions at room temperature.

A mixture of components (a), (b), and (c) in the stated preferred portions will begin to cure immediately on mixing at room temperature and within a period of less than 4 hours will become a non-injectable gel. Even if said mixture is injected into a hot mold promptly, while still in the liquid state, the components of the mixture may have reacted sufficiently to cause the mixture to cure extremely rapidly in the hot mold and undesirable gelation of the injected mixture can occur before the mold is filled, a phenomenon commonly referred to as scorching.

It is necessary to inhibit the action of the catalyst (c) at room temperature with a platinum catalyst inhibitor (d) so that the compositions of this invention will remain suitably injectable in a method of liquid injection molding. For the purpose of this invention the compositions of this invention should have a Standard Pot Life, hereinbefore described, of greater than 10 hours at room temperature in order to be suitable for use in said method. However, to be useful in a method of liquid injection an injected composition must also cure rapidly to a coherent state so that the method of liquid injection can be used to produce a cured, molded article in a short period of time, for example, less than 60 seconds. For the purposes of this invention a composition suitable for use in a method of liquid injection must have a Standard Cure Time, hereinbefore described, of less than 100 seconds at 121° C.

Not all platinum catalyst inhibitors, when used as (d) in the compositions of this invention will afford a Standard Pot Life of greater than 10 hours at 25° C. and, concurrently, a Standard Cure Time of less than 100 seconds at 121° C. We have found that only certain olefinic siloxanes and certain acetylenic silanes and siloxanes are suitable for use as (d) in the compositions of this invention.

One type of platinum catalyst inhibitor suitable for use as (d) are the acetylenic silanes and siloxanes described in U.S. Pat. No. 3,445,420 to Kookootsedes, et al. which is hereby incorporated by reference to show the preparation of acetylenic silanes and siloxanes and their use as inhibitors. Preferred for use as (d) are the acetylenic silanes of the formulae

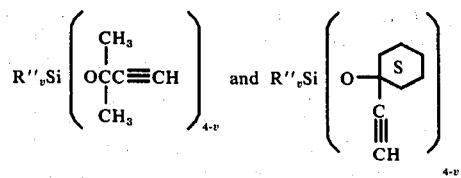

These compounds are preferred because they inhibit the action of catalyst (c) for more than 24 hours at room temperature, thereby affording a Standard Pot Life of greater than 10 hours and still permit a Standard Cure Time of less than 100 seconds for the compositions of this invention in which they are used. Each R'' can be, independently, methyl, ethyl, phenyl, or 3,3,3-trifluoropropyl and $v$ can be 0, 1 or 2. Of course, mixtures of compounds having the above formulae and having several values of $v$, within the limits stated, are also effective as (d).

A second type of platinum catalyst inhibitor suitable for use as (d) are the olefinic siloxanes that are described in the application of Chi-Long Lee and Ollie W. Marko entitled, "Olefinic Siloxanes as Platinum Inhibitors," Ser. No. 528,966, filed Dec. 2, 1974, now U.S. Pat. No. 3,989,667 and assigned to the assignee of this application; said application being hereby incorporated by reference to show the preparation of olefinic siloxanes and their use in silicone compositions as platinum catalyst inhibitors. In particular, olefinic siloxanes having the formula

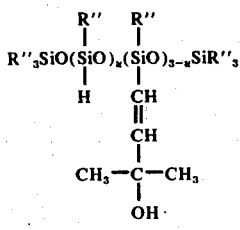

are preferred as the platinum catalyst inhibitor (d) because these olefinic siloxanes inhibit the action of catalyst (c) for more than 24 hours at room temperature thereby affording a Standard Pot Life of greater than 10 hours and still permit a Standard Cure Time of less than 100 seconds. Furthermore the low volatility of these preferred olefinic siloxanes permits the use of the compositions of this invention in the open without concern for loss of the inhibitor due to evaporation. Each $R''$ in the olefinic siloxanes above can be, independently, methyl, ethyl, phenyl, or 3,3,3-trifluoropropyl and $u$ can be 1 or 2. It is to be understood that mixtures of olefinic siloxanes of the formula shown in which $u$ is 1 and 2 are also operative as platinum catalyst inhibitor (d) in the compositions of this invention.

A third type of platinum catalyst inhibitor suitable for use as (d) are the vinylorganocyclosiloxanes of the formula

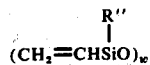

wherein $R''$ is methyl, ethyl, phenyl or 3,3,3-trifluoropropyl and $w$ has an average value of from 3 to 6.

Vinylorganocyclosiloxanes are well known in the organosilicon art, especially where $R''$ is methyl and $w$ is 3, 4, or 5.

The amount of platinum catalyst inhibitor (d) to be used in the compositions of this invention is simply the amount needed to produce a Standard Pot Life of greater than 10 hours at 25° C. and yet not extend the Standard Cure Time of the compositions of this invention in which it is used to 100 seconds or more at 121° C. This amount will vary widely and will depend upon the particular inhibitor that is used, the nature and concentration of the platinum-containing catalyst and the nature of the curing agent (b). For example, we have found that the curing of these compositions is more easily inhibited when the polyorganosiloxane (i) in curing agent (b) bears 3,3,3-trifluoropropyl groups than when (i) bears only methyl groups as the organic groups.

Inhibitor (d), added in amounts as small as one mole of inhibitor for every mole of platinum will in some instances cause an inhibition of the catalyst (c) and afford a Standard Pot Life of greater than 10 hours. In other cases, considerably more inhibitor, such as 10, 50, 100, 500 and more moles of inhibitor for every mole of platinum may be needed to achieve the desired combination of a Standard Pot Life greater than 10 hours at room temperature and a Standard Cure Time less than 100 seconds at 121° C. The exact amount of any particular inhibitor to be used in the compositions of this invention should be determined by simple experimentation.

The inhibiting effect of platinum catalyst inhibitor (d) can be overcome by heating the compositions of this invention to a temperature of 70° C. or higher. In the liquid injection molding method of this invention the compositions of this invention are injected into a cavity of a mold which is heated to a temperature of greater than 100° C., preferably greater than 150° C. Under such conditions, the inhibiting effect of the platinum catalyst inhibitor is readily overcome and the injected composition cures rapidly in the cavity.

Filler (e) is a reinforcing silica filler having a surface area of greater than 50 square meters per gram, preferably greater than 150 square meters per gram, that has been treated with an organosilicon compound so that the compositions of this invention do not undergo appreciable stiffening with time, a phenomenon known as crepe-aging. The organic groups of said organosilicon compound can be methyl, ethyl, phenyl, vinyl, or 3,3,3-trifluoropropyl. Organosilicon compounds which deposit on the surface of the silica filler triorganosiloxane units such as trimethylsiloxane units, vinyldimethylsiloxane units and dimethyl-3,3,3-trifluoropropylsiloxane units are preferred treating agents.

Silica fillers and their treatment are well known in the silicone rubber art. The silica filler can be pretreated or treated in situ in the well known fashion. Methods of preparing treated silica fillers are taught by Smith in U.S. Pat. No. 3,635,743 and by Hartlage in U.S. Pat. No. 3,624,023 which are hereby incorporated by reference to show the preparation of treated silica fillers which are suitable for use in the compositions of this invention. However, silica filler (e) can be prepared by any suitable method for preparing treated silicas as long as the surface area of the silica is as stated herein and the compositions do not undergo appreciable crepe-aging.

The amount of filler (e) that is used in the compositions of this invention must be at least 5 parts by weight for every 100 parts by weight of the polydiorganosiloxane fluid (a). However, the amount of silica used should not be so great that the Standard Injection Rate, hereinbefore described, of the composition of this invention is 100 grams per minute or less. For the purposes of this invention it is preferred to use as much silica as possible in the composition without producing a Standard Injection Rate of 100 grams per minute or less for said composition.

The compositions of this invention may contain other components that are common to the silicone rubber art, such as pigments, extending fillers, antioxidants, compression set additives and thermal stability additives as long as the desirable properties of said compositions are not compromised thereby.

The compositions of this invention are obtained whenever the recited components are mixed in the indicated proportions. The order of mixing is not critical; however, if the composition is not to be used immediately or if the composition is to be used in a method of liquid injection molding it is preferred to have inhibitor (d) present when copolymer fluid (a), organosiloxane (b) and catalyst (c) are mixed, since a curing reaction involving components (a), (b), and (c) begins immediately at room temperature if inhibitor (d) is not present.

Since component (b) and component (d) frequently are volatile or contain desirable volatile compounds, it is preferred that said components be admixed after any and all heating and/or vacuum operations in the preparation of the compositions of this invention have been completed. It is also preferred that no component or mixture of components be heated above 300° C. during the preparation of the compositions of this invention.

The best way to prepare the compositions of this invention is to mix copolymer (a), silica (e) and any additives in a dough mixer, using heat to facilitate mixing and vacuum to remove volatile materials. The resulting mixture is then cooled below 50° C., preferably to room temperature and mixed with the catalyst (c), the inhibitor (d) and organopolysiloxane (b) in that order. Alternately components (b), (c), and (d) can be added to the cooled mixture simultaneously or in any order that provides for the presence of inhibitor (d) whenever components (a), (b), and (c) are mixed.

The compositions of this invention can be prepared to have a Standard Pot Life of several days at room temperature and are therefore considered to be one-package compositions; i.e. said compositions can be prepared and stored before using. Storing the compositions of this invention at low temperatures, e.g. at −20° C., will permit an even longer period of storage. It is obvious that said compositions can also be prepared by combining two or more packages, each package comprising an uncurable mixture of some of the components of the composition. For example, it is within the scope of this invention to prepare a first package comprising a mixture of the appropriate amounts of copolymer (a), silica (e), and catalyst (c) and a second package comprising a mixture of the appropriate amounts of organosiloxane (b) and inhibitor (d) and to mix the two packages to prepare the compositions of this invention at any time prior to use of said compositions. Obviously there are many other ways to combine the recited components to prepare the compositions of this invention in multi-package form.

The compositions of this invention are curable by heating them to a temperature of greater than 70° C., preferably greater than 100° C., either in a confined area or exposed to the atmosphere. Curing temperatures of greater than 300° C., should be avoided. The compositions of this invention are useful in an injection molding process to prepare solvent resistant articles such as O-rings for fuel line couplings and hydraulic seals and connector-plug inserts for electrical couplings. Obviously, the compositions of this invention are useful for preparing elastomeric articles by methods other than liquid injection.

This invention further relates to a method of injection molding of elastomeric articles having a mass of less than 100 grams per article comprising (A) injecting less than 100 grams of a composition of this invention into a cavity of a hot mold at a pressure of less than 352 kg./sq.cm., to fill the cavity before gelation of the injected composition occurs, the temperature of the composition being less than 50° C. and the temperature of the mold being greater than 100° C. (B) allowing the injected composition of (A) to cure in the cavity of the hot mold to form an elastomeric article, and (C) removing the elastomeric article of (B) from the cavity of the hot mold, the temperature of the mold being maintained above 100° C. during the practice of the method.

The compositions of this invention which are useful in this method contain an amount of platinum-catalyst inhibitor which is effective to inhibit the cure of the compositions at room temperature, the action of said inhibitor being negated at temperatures above 70° C. as stated hereinbove. Compositions stored at temperatures above 50° C., although having their cure inhibited at room temperature, may undergo some curing above 50° C. but below 70° C. For this reason the temperature of the composition to be injected should be maintained at less than 50° C., preferably at room temperature, to prevent premature and undesirable gelling and/or curing of the composition. The temperature of the mold should be maintained above 100° C., preferably above 150° C., during the practice of this method to heat and cure the injected composition rapidly. However, the temperature of the mold should not be so high as to cause curing of the injected composition before the injecting is complete.

Because of the large value of the Standard Injection Rate, hereinbefore defined, the compositions of this invention can be rapidly injected into a cavity of a mold under relatively low pressure. Hence, excessive material loss due to leakage of the composition from openings in the apparatus, such as at the part line formed by the mating surfaces of the mold, which would occur at high pressure, is eliminated. Low injection pressures also allow the encapsulation of delicate objects by injection molding techniques without damage to the encapsulated object. In the method of this invention an injection pressure of less than 352 kg./sq.cm. (5,000 psi) is used to inject less than 100 grams of the curable composition of this invention into the cavity of a mold. The injection pressure should be great enough, however, to completely fill the cavity of the hot mold with the composition before the injected composition undergoes gelation. Gelation is that process by which a curable composition is converted from an injectable state to a non-injectable state through the partial or complete action of the curing process.

Because of the unique combination of certain ingredients, the compositions of this invention, when injected into a cavity of a mold maintained at a temperature of greater than 100° C. will cure rapidly to an elastomeric article. The compositions of this invention will cure in the cavity within 100 seconds or less at 121° C., and within a correspondingly shorter time at temperatures greater than 121° C., to a strong elastomeric article. The elastomeric article can be advantageously removed from the hot mold without requiring any separate cooling operation. The article can be used immediately or it can be given a post cure, if desired, in any suitable fashion to further develop one or more physical properties such as compression set, durometer, and resilience.

The following examples are for the purpose of further describing this invention and should not be construed as limiting the invention which is delineated in the appended claims. All parts are parts by weight. Tensile strength and elongation were measured according to ASTM D-412. Tear strength (Die B) was measured according to ASTM D-624. Standard Pot Life was measured at room temperature using a Brookfield viscometer and is the time required at room temperature for the viscosity of the composition to increase from the as-mixed viscosity to a value twice as large as the as-mixed viscosity. Standard Cure Rate and Standard Injection Rate were measured as hereinbefore described.

EXAMPLE 1

A mixture of 352.7 g. (2.26 moles) of 2,4,6-trimethyl-2,4,6-tris(3,3,3-trifluoroproply)-cyclotrisiloxane, 164.4 g. (2.22 moles) of cyclopolydimethylsiloxanes and 7.9 g. (0.042 moles) of sym-divinyltetramethyldisiloxane was heated to 66° C. and 0.5 ml. of trifluoromethanesulfonic acid was added. After 3 hours of stirring and heating the mixture was cooled and 2 g. of solid sodium bicarbonate was stirred into the mixture to neutralize the acid. After 2 hours the mixture was filtered and a vinyldimethyl-siloxane-endblocked copolymer having a substantially random, linear arrangement of equal molar amounts of dimethylsiloxane units and methyl-3,3,3-trifluorpropylsiloxane units was recovered. The copolymer has a viscosity of about 500 centistokes at 25° C. One hundred parts of the copolymer were mixed with 30 parts of a reinforcng silica filler having a surface area of approximately 400 sq. meters per gram. The silica filler had been treated with hexamethyldisilazane so that its surface had trimethylsiloxane units bonded thereto. To the mixture of copolymer and silica was admixed 0.5 parts of a polysiloxane solution of chloroplatinic acid which was 0.6 percent by weight platinum and methylvinylcyclopolysiloxane as a a platinum-catalyst inhibitor. The resulting mixture was mixed with 4.39 parts of curing agent comprising $H(CH_3)_2SiO_{1/2}$ units and $CF_3CH_2CH_2SiO_{3/2}$ units giving approximately 2.0 silicon-bonded hydrogen atoms for every silicon-bonded vinyl group in the composition. The resulting curable composition had a Standard Injection Rate of 234 grams per minute. In like manner compositions were prepared using similar copolymers having 50 mole percent dimethylsiloxane units and 50 mole percent methyl-3,3,3-trifluoropropylsiloxane units but having various viscosities. Table I shows the Standard Injection Rate of each composition.

TABLE I

| Copolymer Viscosity (centipoise at 25° C.) | Standard Injection Rate (grams/minute) | Curing Agent (parts/100 parts copolymer) |
|---|---|---|
| 500 | 234 | 4.39 |
| 1700 | 250 (1)(2) | 4.26 |
| 1700 | 315 (1) | 4.48 |
| 2100 | 178 | 1.87 |
| 5000 | 96 | 1.89 |

(1) contains an additional 2 parts of trimethylsiloxane-treated silica having a surface area of approximately 300 sq. meters per gram.
(2) Contains 0.5 part of red iron oxide.

EXAMPLE 2

One hundred parts of a copolymer having a viscosity of 2100 centistokes at 25° C. and having vinyldimethylsiloxane endgroups and an equal molar amount of dimethylsiloxane units and methyl-3,3,3-trifluoropropylsiloxane units was mixed with 30 parts of the treated silica of Example 1, 0.82 parts of $\{H(CH_3)_2SiO\}_4Si$, 0.82 parts of $H(CH_3)_2SiO\{SiO(CH_3)(CH_2CH_2CF_3)\}_3Si(CH_3)_2H$, 0.25 parts of red iron oxide, 0.25 parts of a platinum-containing catalyst comprising the reaction product of chloroplatinic acid and divinyltetramethyldisiloxane (15 ppm. platinum in the composition) and 0.04 parts of the platinum catalyst inhibitor shown in Table II, which also shows the Standard Pot Life and Standard Cure Time for each composition.

TABLE II

| Inhibitor | Inhibitor/Platinum (moles) | Standard Pot Life | Standard Cure Time |
|---|---|---|---|
| $(CH_3)_2Si\left(OC(CH_3)_2C\equiv CH\right)_2$ | 17 | 32 hours | 66 seconds |
| $CF_3CH_2CH_2Si(CH_3)\left(OC(CH_3)_2C\equiv CH\right)_2$ | 13 | 94 hours | 125 seconds |
| $(CH_3)_2Si\left(O\text{-cyclohexyl-}C\equiv CH\right)_2$ | 13 | 79 hours | 96 seconds |
| $CF_3CH_2CH_2Si(CH_3)\left(O\text{-cyclohexyl-}C\equiv CH\right)_2$ | 11 | 36 hours | 125 seconds |

TABLE II-continued

| Inhibitor | Inhibitor/Platinum (moles) | Standard Pot Life | Standard Cure Time |
|---|---|---|---|
| 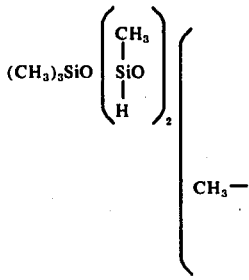 | 45 (3) | 20 hours | 60 seconds |
|  | 91 (3X4) | 48 hours | 78 seconds |
|  | 136 (3X5) | >5 days | 114 seconds |

(3) 0.2 parts of inhibitor used.
(4) 10 ppm. Pt.
(5) 5 ppm. Pt.

EXAMPLE 3

Three composition were prepared, each containing 100 parts of the copolymer and 30 parts of the silica filler of Example 2, 1.12 parts of $H(CH_3)_2SiO\}_4Si$, 0.75 parts of $\{H(CH_3)_2SiO\{SiO(CH_3)-(CH_2CH_2CF_3)\}_3Si(CH_3)_2H$, 0.25 parts each of the platinum-containing catalyst and red iron oxide at Example 2 (15 ppm. platinum in the composition) and varying amounts of an olefinic siloxane with the formula

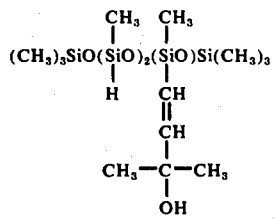

Table III shows the Standard Cure Time, Standard Injection Rate and Standard Pot Life of each composition.

TABLE III

| Inhibitor (parts) | Inhibitor/Platinum (moles) | Standard Cure Time (Seconds) | Standard Injection Rate (sec.) | Standard Pot Life (Hours) |
|---|---|---|---|---|
| .20 | 46 | 33 | 178 | 16 |
| .41 | 92 | 72 | 164 | 40 |
| .82 | 185 | 90 | 90 | >48 |

EXAMPLE 4

A composition was prepared without a curing agent by mixing on a three-roll mill 100 parts of a vinyldimethylsiloxane-endblocked copolymer of equal molar amounts of dimethylsiloxane units and methyl-3,3,3-trifluoropropylsiloxane units and having a viscosity of 1800 centistokes at 25° C., 30 parts of a silica filler having a surface area of 400 sq. meters per gram and having trimethylsiloxane units bonded to the surface thereof so that the treated silica was 4.38 percent carbon by weight, (0.08 trimethylsiloxane units for every $SiO_{4/2}$ unit in the silica filler), 0.15 parts of the catalyst of Example 2 (9 ppm. in the composition) and 0.07 parts of methylvinylcyclosiloxane (33 moles of inhibitor for every mole of platinum). Portions of this composition were then mixed with, the polyorganosiloxane (i) described below and, where indicated, the appropriate amount of $H(CH_3)_2SiO\{(CH_3)(CF_3CH_2CH_2)SiO\}_3Si(CH_3)_2H$. The mixture was press cured at 150° C. for 15 minutes and oven cured at 200° C. for 8 hours. The resulting samples were tested for tensile strength, elongation and tear strength according to the methods referenced above. Table IV shows the results for composition containing only polyorganosiloxane (i) as the curing agent. Table V shows the results for composition containing mixtures of polyorganosiloxane (i) and $H(CH_3)_2SiO\{(CH_3)(CF_3CH_2CH_2)-SiO\}_3Si(CH_3)_2H$ (polydiorganosiloxane (ii) as the curing agent.

| Polyorganosiloxane (i) |
|---|
| A. $\quad CH_2CH_2CF_3$ |
| $\quad\quad\quad |$ |
| $\quad H(CH_3)_2SiO(SiO)_2Si(CH_3)_2H$ |
| $\quad\quad\quad\quad |$ |
| $\quad\quad\quad OSi(CH_3)_2H$ |
| B. $\quad Si[OSi(CH_3)_2H]_4$ |
| C. $\quad CH_3 \quad CH_3 \quad CH_3$ |
| $\quad\quad\quad |\quad\quad |\quad\quad |$ |
| $\quad H(CH_3)_2SiO(SiO)_3(SiO)_2(SiO)_3Si(CH_3)_2H$ |
| $\quad\quad\quad\quad |\quad\quad |\quad\quad |$ |
| $\quad\quad\quad H \quad CH_3 \quad CH_2CH_2CF_3$ |
| D. $\quad CH_3 \quad CH_3$ |
| $\quad\quad |\quad\quad |$ |
| $\quad (CH_3)_3SiO(SiO)_5(SiO)_3Si(CH_3)_3$ |
| $\quad\quad\quad |\quad\quad |$ |
| $\quad\quad H \quad CH_3$ |

TABLE IV

| Polyorganosiloxane (i) and SiH/SiVi ratio* | Tensile Strength (kg./sq.cm.) | Elongation (percent) | Tear Strength (kg./cm.) |
|---|---|---|---|
| A   1.1 | 51.2 | 382 | 8.23 |
| 1.3 | 48.5 | 314 | 8.05 |
| 1.5 | 44.5 | 304 | 8.05 |
| 1.8 | 42.1 | 281 | 7.16 |
| B   1.1 | 50.6 | 381 | 6.44 |
| 1.3 | 51.4 | 322 | 6.98 |
| 1.5 | 46.8 | 337 | 6.98 |
| 1.8 | 49.5 | 341 | 7.16 |
| C**  1.1 | 37.6 | 307 | 5.55 |
| 1.3 | 40.4 | 258 | 5.73 |
| 1.5 | 37.7 | 258 | 5.55 |
| 1.8 | 28.5 | 174 | 5.01 |
| D**  1.1 | 36.1 | 229 | 5.01 |
| 1.3 | 38.1 | 210 | 5.01 |
| 1.5 | 32.8 | 177 | 4.65 |

TABLE IV-continued

| Polyorganosiloxane (i) and SiH/SiVi ratio* | Tensile Strength (kg./sq.cm.) | Elongation (percent) | Tear Strength (kg./cm.) |
|---|---|---|---|
| 1.8 | 33.0 | 160 | 4.29 |

*Ratio of silicon-bonded hydrogen atoms in polyorganosiloxane (i) to silicon-bonded vinyl groups in the composition.
**Included for comparison purposes to show the deleterious effect of CH$_3$(H)SiO units in the polyorganosiloxane (i).

TABLE V

| Polyorganosiloxane (i) and ii/i ratio* | Tensile Strength (kg./sq.cm.) | Elongation (percent) | Tear Strength (kg./cm.) |
|---|---|---|---|
| A    0    | 48.5 | 314 | 8.05 |
|      0.23 | 49.5 | 400 | 10.02 |
|      0.46 | 48.5 | 477 | 11.10 |
|      0.93 | 43.9 | 460 | 7.34 |
| B    0    | 51.4 | 322 | 6.98 |
|      0.23 | 49.0 | 343 | 6.98 |
|      0.46 | 48.5 | 356 | 11.27 |
|      0.90 | 50.0 | 410 | 10.56 |
| C**  0    | 40.4 | 258 | 5.73 |
|      0.13 | 36.6 | 286 | 6.08 |
|      0.27 | 39.5 | 339 | 6.80 |
|      0.54 | 24.2 | 305 | 4.12 |
| D**  0    | 38.1 | 210 | 5.01 |
|      0.31 | 33.3 | 208 | 5.55 |
|      0.61 | 29.0 | 229 | 4.12 |
|      1.22 | 30.5 | 306 | 5.37 |

*Ratio of silicon-bonded hydrogen atoms in polydiorganosiloxane (ii) to silicon-bonded hydrogen atoms in polyorganosiloxane (i). The ratio of the total number of silicon-bonded hydrogen atoms in (i) + (ii) to silicon-bonded vinyl groups in the composition was 1.3/1.
**Included for comparison purposes to show the deleterious effect of CH$_3$(H)SiO units in the polyorganosiloxane (i).

EXAMPLE 5

A vinyldimethylsiloxane-endblocked copolymer of equal molar amounts of dimethylsiloxane units and methyl-3,3,3-trifluoropropylsiloxane units was prepared by heating a mixture of the appropriate amounts of dimethylcyclopolysiloxane, 2,4,6-trimethyl-2,4,6-tris(3,3,3-trifluoropropyl)cyclotrisiloxane, symdivinyl-tetramethyldisiloxane and a sufficient amount of potassium hydroxide to provide 1 potassium for every 2000 silicons in the mixture for 4.5 hours at 150° C. The resulting polymerized mixture was cooled and the catalyst was neutralized with a small amount of glacial acetic acid. The neutralized copolymer was stripped at 190° c. and at a pressure of less than 1 mm. of mercury for 90 minutes to remove euilibrium cyclopolysiloxanes. The remaining copolymer had a viscosity of 2300 centistokes at 25° C. One hundred parts of this copolymer was used in place of the 2100 centistoke copolymer to prepare the composition of Example 2. The inhibitor was 0.04 grams of bis(3-methyl-1-butyn-3-oxy)dimethylsilane. When cured for 15 minutes at 150° C. and 8 hours at 200° C. this composition had a tensile strength of 46.6 kg./sq.cm., an elongation at break of 550 percent and a tear strength of 8.59 kg./cm.

That which is claimed is:

1. A curable composition suitable for use in a method of liquid injection molding of elastomeric articles, consisting essentially of a. 100 parts by weight of an essentially linear polydiorganosiloxane fluid copolymer having two siloxane-bonded vinyl groups per molecule and having the average formula

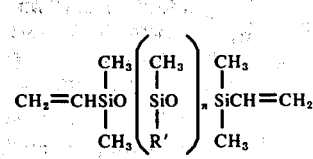

wherein from 25 to 75 percent of all R' groups are 3,3,3-trifluoropropyl and the remaining R' groups are methyl and n has an average value such that the viscosity of (a) has a value of from 500 to 10,000 centistokes at 25° C., b. an organosiloxane, soluble in (a) and consisting essentially of
 i. a polyorganosiloxane consisting essentially of H(CH$_3$)$_2$SiO$_{1/2}$ units and units selected from the group consisting of QSiO$_{3/2}$ units and SiO$_{4/2}$ units, there being from 3 to 10 inclusive silicon-bonded hydrogen atoms per molecule of (i), Q is 3,3,3-trifluoropropyl, phenyl or an alkyl group having 1 to 6 inclusive carbon atoms and the ratio of the total number of SiO$_{4/2}$ units and QSiO$_{3/2}$ units to H(CH$_3$)$_2$SiO$_{1/2}$ units in (i) has an average value of from 0.25 to 0.75 and,
 ii. a polydiorganosiloxane consisting essentially of H(CH$_3$)$_2$SiO$_{1/2}$ units and R"$_2$SiO units, wherein each R" methyl, ethyl, phenyl, or 3,3,3-trifluoropropyl, there being two silicon-bonded hydrogen atoms per molecule of (ii) and an average of from 3 to 10 silicon atoms per molecule of (ii), the amounts of (i) and (ii) being sufficient to provide a total of from 0.75 to 3.0 silicon bonded hydrogen atoms in (b) for every silicon-bonded vinyl group in the composition and from 0 to 1 inclusive silicon-bonded hydrogen atom in (ii) for every silicon-bonded hydrogen atom in (i), c. a platinum-containing catalyst, soluble in (a) and providing at least 1 part by weight of platinum for every 1 million parts by weight of the composition, d. an effective amount of a platinum catalyst inhibitor selected from the group consisting of acetylenic silanes of the formulae

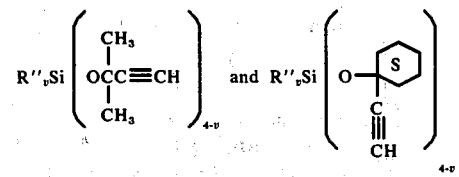

and olefinic siloxanes of the formulae

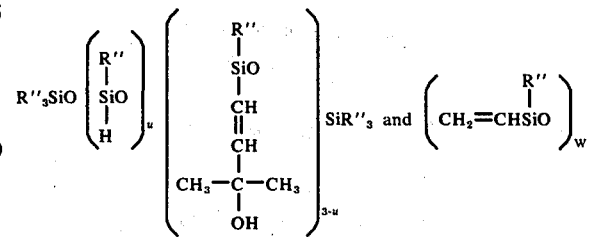

wherein R" is, independently, methyl, ethyl, phenyl or 3,3,3-trifluoropropyl, u is an integer from 1 to 2 inclusive, v is an integer from 0 to 2 inclusive and w is an integer from 3 to 6 inclusive, and e. at least 5 parts by weight of a reinforcing silica filler having a surface area of at least 50 square meters per gram and having the surface thereof treated with an organosilicon compound to prevent appreciable crepe-aging of the curable composition; said curable composition having a Standard Injection Rate of greater than 100 grams per minute at 25° C. a Standard Cure Time of less than 100 seconds at 121° C., a Standard Pot Life of greater than 10 hours at 25° C., and when heated at 150° C. for 15 minutes and at 200° C. for 8 hours, will cure to an elastomeric material characterized by a tensile strength greater than 42 kg./sq.cm., and elongation at break greater than 300 percent and a tear strength greater than 7 kg./cm.

2. The composition of claim 1, wherein the polydiorganosiloxane fluid copolymer (a) consists essentially of equal molar amounts of dimethylsiloxane units and methyl-3,3,3-trifluoropropylsiloxane units and has a viscosity of from 500 to 5,000 centistokes at 25° C.

3. The composition of claim 2, wherein the platinum-containing catalyst (c) is the reaction product of chloroplatinic acid and sym-divinyltetramethyldisiloxane.

4. The composition of claim 3, wherein the polyorganosiloxane (i) is selected from the group consisting of

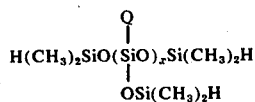

and

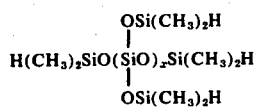

where $x$ has an average value of from 1 to 4 inclusive, the polydiorganosiloxane (ii), if any, has the formula

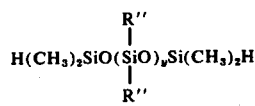

where $y$ has an average value of from 1 to 3 inclusive.

5. The composition according to claim 4, wherein the polyorganosiloxane (i) is $Si\{OSi(CH_3)_2H\}_4$, the polydiorganosiloxane (ii) is

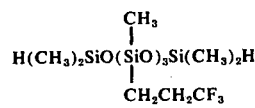

the inhibitor (d) has the average formula

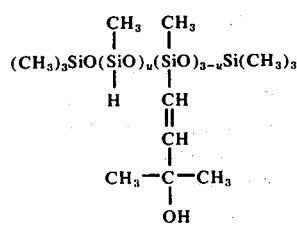

where $u$ has an average value of from 1 to 2 inclusive and the ratio of silicon-bonded hydrogen atoms in (ii) to silicon-bonded hydrogen atoms in (i) has a value of from 0.2 to 0.6.

6. The composition according to claim 3, wherein the polyorganosiloxane (i) has the average formula

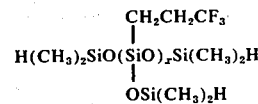

wherein $x$ has an average value of 2, the polydiorganosiloxane (ii) is

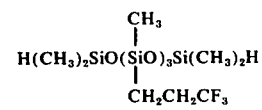

the inhibitor (d) has the average formula

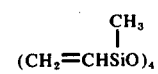

and the ratio of silicon-bonded hydrogen atoms in (ii) to silicon-bonded hydrogen atoms in (i) has a value of from 0.2 to 0.6.

7. The elastomeric composition obtained by heating the curable composition of claim 1, to a temperature sufficiently high to cause curing of the composition.

8. A method comprising
A. injecting less than 100 grams of the composition of claim 1, into a cavity of a hot mold at a pressure of less than 352 kg./sq.cm. to fill the cavity before gelation of the injected composition occurs, the temperature of the composition before injection being less than 50° C., and the temperature of the mold being greater than 100° C.,
B. allowing the injected composition of (A) to cure in the cavity of the hot mold to form an elastomeric article, and
C. removing the elastomeric article of (B) from the cavity of the hot mold, the temperature of the mold being maintained above 100° C. during the method.

9. A method comprising
A. injecting less than 100 grams of the composition of claim 5, into a cavity of a hot mold at a pressure of less than 352 kg./sq.cm. to fill the cavity before gelation of the injected composition occurs, the temperature of the composition before injection being less than 50° C. and the temperature of the mold being greater than 100° C.,
B. allowing the injected composition of (A) to cure in the cavity of the hot mold to form an elastomeric article, and
C. removing the elastomeric article of (B) from the cavity of the hot mold, the temperature of the mold being maintained above 100° C. during the method.

10. The article prepared by the method of claim 8.

11. The article prepared by the method of claim 9.

UNITED STATES PATENT AND TRADEMARK OFFICE
CERTIFICATE OF CORRECTION

PATENT NO. : 4,032,502

DATED : June 28, 1977

INVENTOR(S) : Chi-Long Lee et al.

It is certified that error appears in the above-identified patent and that said Letters Patent are hereby corrected as shown below:

The title "ORGANOSILOXANE COMPOSITIONS FOR LIQUID INJECTION" should read --ORGANOSILOXANE COMPOSITIONS FOR LIQUID INJECTION MOLDING--.

Column 2, line 48, after "Monsanto" insert --®--.

Column 13, line 26, the word "has" should read --had--.

Column 15, line 25, the formula "$H(CH_3)_2SiO\}_4Si$" should read --$\{H(CH_3)_2SiO\}_4Si$--.

Column 15, line 26, the formula "$\{H(CH_3)_2SiO\{SiO(CH_3)-$" should read -- $H(CH_3)_2SiO\{SiO(CH_3)-$ --.

Column 16, lines 29 & 30, the word bridging these two lines should read --compositions--.

Column 16, line 31, the word "composition" should read --compositions--.

UNITED STATES PATENT AND TRADEMARK OFFICE
CERTIFICATE OF CORRECTION

PATENT NO. : 4,032,502

DATED : June 28, 1977

INVENTOR(S) : Chi-Long Lee et al.

It is certified that error appears in the above-identified patent and that said Letters Patent are hereby corrected as shown below:

Column 16, line 33, the formula

"$H(CH_3)_2SiO\{(CH_3) \quad (CF_3CH_2CH_2)-SiO\}_3Si(CH_3)_2H$" should read --$H(CH_3)_2SiO\{(CH_3)(CF_3CH_2CH_2)SiO\}_3Si(CH_3)_2H$--

Column 17, line 50, the word "euilibrium" should read --equilibrium--.

Signed and Sealed this

Twenty-third Day of December 1980

[SEAL]

Attest:

SIDNEY A. DIAMOND

Attesting Officer

Commissioner of Patents and Trademarks